US010139523B2

(12) United States Patent
Liang

(10) Patent No.: US 10,139,523 B2
(45) Date of Patent: Nov. 27, 2018

(54) DISPLAY SUBSTRATE AND METHOD FOR MANUFACTURING THE SAME, DISPLAY PANEL AND DISPLAY DEVICE

(71) Applicants: BOE Technology Group Co., Ltd., Beijing (CN); Beijing BOE Display Technology Co., Ltd., Beijing (CN)

(72) Inventor: Kui Liang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 151 days.

(21) Appl. No.: 15/231,989

(22) Filed: Aug. 9, 2016

(65) Prior Publication Data
US 2017/0212279 A1 Jul. 27, 2017

(30) Foreign Application Priority Data

Jan. 25, 2016 (CN) .......................... 2016 1 0049260

(51) Int. Cl.
*H01L 33/00* (2010.01)
*G02B 1/116* (2015.01)
(Continued)

(52) U.S. Cl.
CPC ............ *G02B 1/116* (2013.01); *H01L 33/005* (2013.01); *H01L 33/44* (2013.01); *H01L 33/58* (2013.01)

(58) Field of Classification Search
CPC ......... H01L 27/14621; H01L 31/02162; H01L 31/02327; H01L 27/14632;
(Continued)

(56) References Cited

U.S. PATENT DOCUMENTS 5,535,056 A * 7/1996 Caskey ................... B60R 1/082
204/192.26
6,065,840 A * 5/2000 Caskey ................... B60R 1/082
359/584
(Continued)

FOREIGN PATENT DOCUMENTS

CN 102694129 A 9/2012
CN 103365013 A 10/2013

OTHER PUBLICATIONS

First Office Action, including Search Report, for Chinese Patent Application No. 201610049260.7, dated Mar. 16, 2018, 11 pages.

*Primary Examiner* — William R Alexander
*Assistant Examiner* — Balram T Parbadia
(74) *Attorney, Agent, or Firm* — Westman, Champlin & Koehler, P.A.

(57) ABSTRACT

A display substrate, a method for manufacturing the display substrate, a display panel and a display device are disclosed. The display substrate includes a base substrate. At least two refractive layers are provided on the base substrate, and a gate electrode is provided on the refractive layers. A refractive index of the refractive layer of two adjacent refractive layers close to the base substrate is less than a refractive index of the refractive layer of two adjacent refractive layers away from the base substrate, and thicknesses of the refractive layers are $n\lambda+\lambda/4$, where $\lambda$ is a wavelength of incident light, and n is a nonnegative integer.

19 Claims, 2 Drawing Sheets

(51) Int. Cl.
*H01L 33/44* (2010.01)
*H01L 33/58* (2010.01)

(58) Field of Classification Search
CPC .......... H01L 27/14665; H01L 31/0232; H01L 33/00; H01L 33/05; B60R 1/083; G02F 1/017; G02F 1/133345; G02F 1/133608; G02F 1/135; G02F 1/136227; G02F 1/13624; G02F 1/136286; G02F 1/17
See application file for complete search history.

(56) References Cited

U.S. PATENT DOCUMENTS

| | | | |
|---|---|---|---|
| 7,893,460 B2* | 2/2011 | Ishimura | B82Y 20/00 257/184 |
| 8,860,034 B2 | 10/2014 | Prushinskiy et al. | |
| 2001/0000676 A1* | 5/2001 | Zhang | G02F 1/135 349/12 |
| 2007/0058055 A1* | 3/2007 | Yamaguchi | H01L 27/14621 348/272 |
| 2008/0265349 A1* | 10/2008 | Kasano | G03B 11/00 257/432 |
| 2009/0321865 A1* | 12/2009 | Kasano | G02B 5/201 257/432 |
| 2010/0096011 A1* | 4/2010 | Griffiths | G02B 5/288 136/257 |
| 2010/0118406 A1 | 5/2010 | Kobori et al. | |
| 2010/0166034 A1* | 7/2010 | Ikuta | H01S 5/18 372/46.014 |
| 2011/0149365 A1* | 6/2011 | Cho | G02B 6/4215 359/245 |
| 2011/0181936 A1* | 7/2011 | Cho | B82Y 20/00 359/260 |
| 2011/0287350 A1* | 11/2011 | Abe | G03G 5/047 430/56 |
| 2012/0206668 A1* | 8/2012 | Sugawara | H01L 29/4908 349/42 |

* cited by examiner forming at least two refractive layers on a base substrate, wherein a refractive index of one of two adjacent refractive layers close to the base substrate is less than a refractive index of the other of two adjacent refractive layers away from the base substrate, and thicknesses of the refractive layers are $n\lambda+\lambda/4$, where $\lambda$ is a wavelength of incident light, and n is a nonnegative integer ⸺1001 forming a gate electrode on the refractive layers ⸺1002

Fig. 3

DISPLAY SUBSTRATE AND METHOD FOR MANUFACTURING THE SAME, DISPLAY PANEL AND DISPLAY DEVICE

CROSS-REFERENCE TO RELATED APPLICATION

This application claims the benefit of Chinese Patent Application No. 201610049260.7, filed on Jan. 25, 2016, entitled "Display Substrate and Method for Manufacturing the Same, Display Panel and Display Device" in the State Intellectual Property Office of China, the whole disclosure of which is incorporated herein by reference.

BACKGROUND OF THE INVENTION

Field of the Invention

The present disclosure relates to a field of display technology, and specifically relates to a display substrate and a method for manufacturing the display substrate, a display panel and a display device.

Description of the Related Art

As the display technology develops, a display device gradually develops in a direction of Ultra-narrow Bezel. Therefore, in contrast to the conventional display device in which a color filter substrate is arranged externally and an array substrate is arranged adjacent to a backlight source, the current display device is gradually configured so that the array substrate is arranged externally and the color filter substrate is arranged adjacent to a backlight source. Since the array substrate is arranged externally, and gate metal lines of the array substrate may intensively reflect external light, the display effect is adversely affected.

In order to solve the above problem, in the prior art, an outer surface of the array substrate is subjected to an anti-reflection process, for example, increasing glass roughness or being attached with an anti-reflection film, after the manufacture of a display panel is completed. However, such anti-reflection processes do not have an adequately good anti-reflection effect, and the manufacturing cost is increased. In addition, in the prior art, a layer of anti-reflection film is incorporated before a gate electrode is formed, during the manufacture of the array substrate. However, the thickness of the anti-reflection film reaches up to 150 nm or more, and the reflectance of the anti-reflection film is only about 20%. Disadvantageously, if the thickness of the anti-reflection film is too large, then it will reduce the flatness of a display area of the display panel, resulting in polyimide (PI) coating defects in a cell process.

SUMMARY OF THE INVENTION

In view of the above issues, the present disclosure provides a display substrate and a method for manufacturing the display substrate, a display panel and a display device, so as to solve the following problems: the conventional anti-reflection process has a poor anti-reflection effect and the thickness of the anti-reflection film is too large so that the flatness of a display area of the display panel is reduced, thereby resulting in polyimide (PI) coating defects in a cell process.

To this end, the present disclosure provides a display substrate, comprising a base substrate, wherein at least two refractive layers are provided on the base substrate, and a gate electrode is provided on the refractive layers, wherein a refractive index of one of two adjacent refractive layers close to the base substrate is less than a refractive index of the other of two adjacent refractive layers away from the base substrate, and thicknesses of the refractive layers are $n\lambda+\lambda/4$, where $\lambda$ is a wavelength of incident light, and n is a nonnegative integer.

Optionally, the at least two refractive layers are a first refractive layer close to the base substrate and a second refractive layer away from the base substrate.

Optionally, the first refractive layer comprises silicon nitride material, and the second refractive layer comprises amorphous silicon material.

Optionally, the first refractive layer has a thickness in a range of 50 nm to 60 nm, and the second refractive layer has a thickness in a range of 25 nm to 35 nm, or 55 nm to 65 nm.

Optionally, the thickness of the first refractive layer is 55 nm, and the thickness of the second refractive layer is 30 nm or 60 nm.

Optionally, the first refractive layer has a refractive index in a range of 1.8 to 2.2, and the second refractive layer has a refractive index in a range of 4.0 to 4.8.

Optionally, the refractive index of the first refractive layer is 2.0, and the refractive index of the second refractive layer is 4.4.

The present disclosure provides a display panel, comprising the display substrate according to any one of the above embodiments.

The present disclosure provides a display device, comprising the above described display panel.

The present disclosure provides a method for manufacturing a display substrate, comprising steps of:

forming at least two refractive layers on a base substrate, wherein a refractive index of one of two adjacent refractive layers close to the base substrate is less than a refractive index of the other of two adjacent refractive layers away from the base substrate, and thicknesses of the refractive layers are $n\lambda+\lambda/4$, where $\lambda$ is a wavelength of incident light, and n is a nonnegative integer; and forming a gate electrode on the refractive layers.

Optionally, the step of forming at least two refractive layers on the base substrate comprises steps of:

forming a first refractive layer on the base substrate; and forming a second refractive layer on the first refractive layer.

Optionally, the first refractive layer comprises silicon nitride material, and the second refractive layer comprises amorphous silicon material.

Optionally, the steps of forming the second refractive layer on the first refractive layer and forming the gate electrode on the refractive layers comprise steps of:

forming a second refractive film on the first refractive layer;

forming a gate metal film on the second refractive film; and etching the second refractive film and the gate metal film so as to form the second refractive layer and the gate electrode, wherein the second refractive layer is located right below the gate electrode.

The present disclosure has the following advantageous effects:

The present disclosure provides a display substrate and a method for manufacturing the display substrate, a display panel and a display device, in which the display substrate comprises a base substrate, at least two refractive layers are provided on the base substrate, and a gate electrode is provided on the refractive layers, wherein a refractive index of the refractive layer of two adjacent refractive layers close to the base substrate is less than a refractive index of the refractive layer of two adjacent refractive layers away from the base substrate, and thicknesses of the refractive layers are $n\lambda+\lambda/4$, where $\lambda$ is a wavelength of incident light, and n is a nonnegative integer. According to the present disclosure, before forming gate metal, at least two refractive layers are firstly formed on the base substrate, the refractive index of the refractive layer of two adjacent refractive layers close to the base substrate is less than the refractive index of the refractive layer of two adjacent refractive layers away from the base substrate, and the refractive layers have specific thickness to form reflective light having opposite vectors. Such reflective light is superposed, thus a light counteraction effect is generated. The technical solutions of the present disclosure is based on a half-wave loss theory, utilizes the light counteraction effect derived from the multi-layer refractive layers and a total reflection derived from the multiple refractive layers having different refractive indexes, maximally reduces reflection intensity of the gate metal, thereby improving the display effect.

BRIEF DESCRIPTION OF THE DRAWINGS

FIG. 3 is a flow chart of a method for manufacturing a display substrate according to a fourth embodiment of the present disclosure.

DETAILED DESCRIPTION OF PREFERRED EMBODIMENTS OF THE INVENTION

In order to provide a better understanding to the technical solutions of the present disclosure for the person skilled in the art, the present disclosure will be further described in detail with reference to the accompanying drawings and the specific embodiments.

First Embodiment

Figure 1:
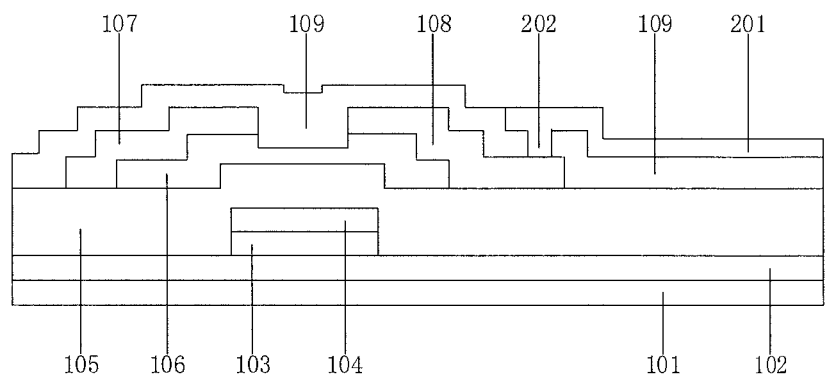
FIG. 1 is a schematic structural view of a display substrate according to a first embodiment of the present disclosure.

FIG. 1 is a schematic structural view of a display substrate according to a first embodiment of the present disclosure. As shown in FIG. 1, the display substrate comprises a base substrate 101, wherein at least two refractive layers are provided on the base substrate 101, and a gate electrode 104 is provided on the refractive layers. A refractive index of the refractive layer of two adjacent refractive layers close to the base substrate 101 is less than a refractive index of the refractive layer of two adjacent refractive layers away from the base substrate 101, and thicknesses of the refractive layers are $n\lambda+\lambda/4$, where $\lambda$ is a wavelength of incident light, and n is a nonnegative integer.

In the present embodiment, the display substrate comprises two refractive layers, i.e., a first refractive layer 102 close to the base substrate and a second refractive layer 103 away from the base substrate. The refractive index of the first refractive layer 102 is less than the refractive index of the second refractive layer 103. The refractive layers have specific thicknesses to form reflective light having opposite vectors, and such reflective light is superposed, thus a light counteraction effect is generated. The technical solutions of the present embodiment is based on a half-wave loss theory, utilizes the light counteraction effect derived from the multi-layer refractive layers and a total reflection derived from the multiple refractive layers having different refractive indexes, maximally reduces reflection intensity of the gate metal, thereby improving the display effect.

Figure 2:
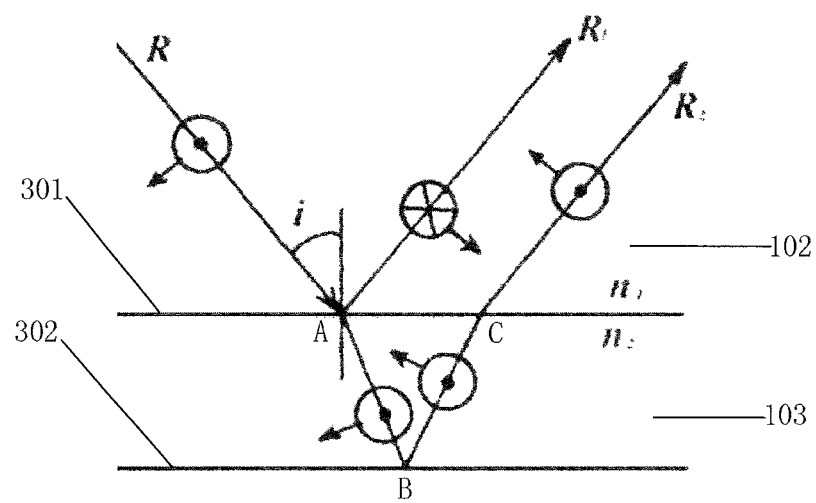
FIG. 2 is a principle diagram of a half-wave loss theory on which the embodiment of the present disclosure is based.

When the light is emitted from an optically thinner medium to an optically denser medium and reflected at the interface therebetween, and the incident light is close to zero degree (normal incidence) or 90° (grazing incidence), the reflected light will generate a phase change by a phase difference value $\pi$, which means that the phases of the incident light and the reflected light at the incident point are different from each other by a phase difference value $\pi$. Since the phase difference value $\pi$ is equivalent to an optical path of half wavelength, such phenomenon is referred to as a half-wave loss. FIG. 2 is a principle diagram of a half-wave loss theory on which the embodiment of the present disclosure is based, as shown in FIG. 2, the refractive index of the first refractive layer 102 is n1, the refractive index of the second refractive layer 103 is n2, wherein n1 is less than n2. A light beam R is transmitted to a first interface 301 and a second interface 302, then forms a reflected light beam R1 at the first interface 301 and a reflected light beam R2 at the second interface 302. In this case, the incident angle i of the incident light is zero degree. It is also available for an incident angle of 90° to generate a half-wave loss, however, this is not the case in the present embodiment, and a discussion for such a case will be omitted herein.

As shown in FIG. 2, the thicknesses d of the refractive layers are configured to be equal to $n\lambda+\lambda/4$, where $\lambda$ is the wavelength of the incident light, and n is a nonnegative integer. In such a way, an optical path difference between the reflected light beam R1 and the reflected light beam R2 is AB+BC, that is, the optical path difference between the reflected light beam R1 and the reflected light beam R2 is approximately 2d, i.e., $2n\lambda+\lambda/2$, equivalent to a half wavelength, therefore a half-wave loss is generated. The light ray shown in FIG. 2 is provided with arrows, which represent vector directions of the light beams. Since the reflected light beam R1 and the reflected light beam R2 have completely opposite vector directions, the reflected light beam R1 and the reflected light beam R2 are superposed so that a light counteraction effect is achieved. The light ray may be counteracted both at the first interface 301 between the first refractive layer 102 and the second refractive layer 103 and at the second interface 302 between the second refractive layer 103 and the base substrate 101, thereby reducing the reflection intensity of the gate metal. In addition, a portion of the light ray may be totally reflected at the first interface 301, thereby maximally reducing the reflection intensity of the gate metal, and improving the display effect.

In the present embodiment, the first refractive layer 102 comprises silicon nitride material, and the second refractive layer 103 comprises amorphous silicon material. Optionally, the first refractive layer 102 has a thickness in a range of 50 nm to 60 nm, and the second refractive layer 103 has a thickness in a range of 25 nm to 35 nm, or 55 nm to 65 nm. Preferably, the thickness of the first refractive layer is 55 nm, and the thickness of the second refractive layer is 30 nm or 60 nm. Optionally, the first refractive layer has a refractive index in a range of 1.8 to 2.2, and the second refractive layer has a refractive index in a range of 4.0 to 4.8. Preferably, the refractive index of the first refractive layer is 2.0, and the refractive index of the second refractive layer is 4.4.

As shown in FIG. 1, a gate insulation layer 105 is provided on the gate electrode 104, an active layer 106 is provided on the gate insulation layer 105, a source electrode 107 and a drain electrode 108 are provided on the active layer 106, a passivation layer 109 is provided on the source electrode 107 and the drain electrode 108, a pixel electrode 201 is provided on the passivation layer 109, a via-hole 202 is provided in the passivation layer 109, and the pixel electrode 201 is connected to the drain electrode 108 via the via-hole 202. Since the first refractive layer 102, the gate insulation layer 105 and the passivation layer 109 are made of the silicon nitride material, it may accordingly reduce the thicknesses of the gate insulation layer 105 and the passivation layer 109 when preparing them, thus the manufacturing time and manufacturing cost may be reduced.

The display substrate according to the present embodiment comprises a base substrate, at least two refractive layers are provided on the base substrate, and a gate electrode is provided on the refractive layers, wherein a refractive index of the refractive layer of two adjacent refractive layers close to the base substrate is less than a refractive index of the refractive layer of two adjacent refractive layers away from the base substrate, and thicknesses of the refractive layers are $n\lambda+\lambda/4$, where $\lambda$ is a wavelength of incident light, and n is a nonnegative integer. According to the present embodiment, before forming gate metal, at least two refractive layers are firstly formed on the base substrate, the refractive index of the refractive layer of two adjacent refractive layers close to the base substrate is less than the refractive index of the refractive layer of two adjacent refractive layers away from the base substrate, and the refractive layers have specific thicknesses to form reflective light having opposite vectors. Such reflective light is superposed, thus a light counteraction effect is generated. The technical solutions of the present embodiment is based on a half-wave loss theory, utilizes the light counteraction effect derived from the multi-layer refractive layers and a total reflection derived from the multiple refractive layers having different refractive indexes, maximally reduces reflection intensity of the gate metal, thereby improving the display effect.

Second Embodiment

The present embodiment provides a display panel, comprising the display substrate according to the first embodiment. It may make reference to the description of the first embodiment for the detailed contents of the display substrate, which is not to be repeated here.

In the display panel according to the present embodiment, the display substrate comprises a base substrate, at least two refractive layers are provided on the base substrate, and a gate electrode is provided on the refractive layers, wherein a refractive index of the refractive layer of two adjacent refractive layers close to the base substrate is less than a refractive index of the refractive layer of two adjacent refractive layers away from the base substrate, and thicknesses of the refractive layers are $n\lambda+\lambda/4$, where $\lambda$ is a wavelength of incident light, and n is a nonnegative integer. According to the present embodiment, before forming gate metal, at least two refractive layers are firstly formed on the base substrate, the refractive index of the refractive layer of two adjacent refractive layers close to the base substrate is less than the refractive index of the refractive layer of two adjacent refractive layers away from the base substrate, and the refractive layers have specific thickness to form reflective light having opposite vectors. Such reflective light is superposed, thus a light counteraction effect is generated. The technical solutions of the present embodiment is based on a half-wave loss theory, utilizes the light counteraction effect derived from the multi-layer refractive layers and a total reflection derived from the multiple refractive layers having different refractive indexes, maximally reduces reflection intensity of the gate metal, thereby improving the display effect.

Third Embodiment

The present embodiment provides a display device, comprising the display panel according to the second embodiment. It may make reference to the description of the second embodiment for the detailed contents of the display panel, which is not to be repeated here.

In the display device according to the present embodiment, the display substrate comprises a base substrate, at least two refractive layers are provided on the base substrate, and a gate electrode is provided on the refractive layers, wherein a refractive index of the refractive layer of two adjacent refractive layers close to the base substrate is less than a refractive index of the refractive layer of two adjacent refractive layers away from the base substrate, and thicknesses of the refractive layers are $n\lambda+\lambda/4$, where $\lambda$ is a wavelength of incident light, and n is a nonnegative integer. According to the present embodiment, before forming gate metal, at least two refractive layers are firstly formed on the base substrate, the refractive index of the refractive layer of two adjacent refractive layers close to the base substrate is less than the refractive index of the refractive layer of two adjacent refractive layers away from the base substrate, and the refractive layers have specific thickness to form reflective light having opposite vectors. Such reflective light is superposed, thus a light counteraction effect is generated. The technical solutions of the present embodiment is based on a half-wave loss theory, utilizes the light counteraction effect derived from the multi-layer refractive layers and a total reflection derived from the multiple refractive layers having different refractive indexes, maximally reduces reflection intensity of the gate metal, thereby improving the display effect.

Fourth Embodiment

FIG. 3 is a flow chart of a method for manufacturing a display substrate according to a fourth embodiment of the present disclosure. As shown in FIG. 3, the method for manufacturing a display substrate comprises steps of:

Step 1001: forming at least two refractive layers on a base substrate, wherein a refractive index of the refractive layer of two adjacent refractive layers close to the base substrate is less than a refractive index of the refractive layer of two adjacent refractive layers away from the base substrate, and thicknesses of the refractive layers are $n\lambda+\lambda/4$, where $\lambda$ is a wavelength of incident light, and n is a nonnegative integer; and Step 1002: forming a gate electrode on the refractive layers.

As shown in FIG. 1, the display substrate comprises two refractive layers, i.e., a first refractive layer 102 close to the base substrate and a second refractive layer 103 away from the base substrate. The refractive index of the first refractive layer 102 is less than the refractive index of the second refractive layer 103. The refractive layers have specific thicknesses to form reflective light having opposite vectors, and such reflective light is superposed, thus a light counteraction effect is generated. The technical solutions of the present embodiment is based on a half-wave loss theory, utilizes the light counteraction effect derived from the multi-layer refractive layers and a total reflection derived from the multiple refractive layers having different refractive indexes, maximally reduces reflection intensity of the gate metal, thereby improving the display effect.

As for the detailed description of the half-wave loss theory, reference may be made to the first embodiment, therefore, it will not be repeated here. In the present embodiment, the light ray may be counteracted both at the first interface 301 between the first refractive layer 102 and the second refractive layer 103 and at the second interface 302 between the second refractive layer 103 and the base substrate 101, thereby reducing the reflection intensity of the gate metal. In addition, a portion of the light ray may be totally reflected at the first interface 301, thereby maximally reducing the reflection intensity of the gate metal, and improving the display effect.

In the present embodiment, the step of forming at least two refractive layers on the base substrate comprises steps of: forming a first refractive layer 102 on the base substrate 101; and forming a second refractive layer 103 on the first refractive layer 102. Optionally, the first refractive layer 102 comprises silicon nitride material, and the second refractive layer 103 comprises amorphous silicon material. Preferably, the steps of forming the second refractive layer on the first refractive layer and forming the gate electrode on the refractive layers comprise steps of: forming a second refractive film on the first refractive layer 102; forming a gate metal film on the second refractive film; and etching the second refractive film and the gate metal film so as to form the second refractive layer 103 and the gate electrode 104, wherein the second refractive layer 103 is located right below the gate electrode 104. In this way, the second refractive layer 103 and the gate electrode 104 may be formed by one patterning process, thereby reducing process steps and manufacturing cost.

In the present embodiment, the first refractive layer 102 has a thickness in a range of 50 nm to 60 nm, and the second refractive layer 103 has a thickness in a range of 25 nm to 35 nm, or 55 nm to 65 nm. Preferably, the thickness of the first refractive layer is 55 nm, and the thickness of the second refractive layer is 30 nm or 60 nm. Optionally, the first refractive layer has a refractive index in a range of 1.8 to 2.2, and the second refractive layer has a refractive index in a range of 4.0 to 4.8. Preferably, the refractive index of the first refractive layer is 2.0, and the refractive index of the second refractive layer is 4.4.

As shown in FIG. 1, a gate insulation layer 105 is formed on the gate electrode 104, an active layer 106 is formed on the gate insulation layer 105, a source electrode 107 and a drain electrode 108 are formed on the active layer 106, a passivation layer 109 is formed on the source electrode 107 and the drain electrode 108, a pixel electrode 201 is formed on the passivation layer 109, a via-hole 202 is provided in the passivation layer 109, and the pixel electrode 201 is connected to the drain electrode 108 via the via-hole 202. Since the first refractive layer 102, the gate insulation layer 105 and the passivation layer 109 are made of the silicon nitride material, it may accordingly reduce the thickness of the gate insulation layer 105 and the passivation layer 109 when preparing them, thus the manufacturing time and manufacturing cost may be reduced.

In the method for manufacturing the display substrate according to the present embodiment, the display substrate comprises a base substrate, at least two refractive layers are provided on the base substrate, and a gate electrode is provided on the refractive layers, wherein a refractive index of the refractive layer of two adjacent refractive layers close to the base substrate is less than a refractive index of the refractive layer of two adjacent refractive layers away from the base substrate, and thicknesses of the refractive layers are nλ+λ/4, where λ is a wavelength of incident light, and n is a nonnegative integer. According to the present embodiment, before forming gate metal, at least two refractive layers are firstly formed on the base substrate, the refractive index of the refractive layer of two adjacent refractive layers close to the base substrate is less than the refractive index of the refractive layer of two adjacent refractive layers away from the base substrate, and the refractive layers have specific thicknesses to form reflective light having opposite vectors. Such reflective light is superposed, thus a light counteraction effect is generated. The technical solutions of the present embodiment is based on a half-wave loss theory, utilizes the light counteraction effect derived from the multilayer refractive layers and a total reflection derived from the multiple refractive layers having different refractive indexes, maximally reduces reflection intensity of the gate metal, thereby improving the display effect.

It should be understood that the above embodiments are merely exemplary embodiments intended to explain the principle of the present disclosure, however, the present disclosure is not limited thereto. Various modifications and alternatives may be made to the embodiments of the present disclosure without deviating from the spirit and scope of the present disclosure, and all the modifications and alternatives fall within the scope of the present disclosure.

What is claimed is:

1. A display substrate, comprising a base substrate, wherein at least two refractive layers are provided on the base substrate, and a gate electrode is provided on the refractive layers, wherein a refractive index of one of two adjacent refractive layers close to the base substrate is less than a refractive index of the other of two adjacent refractive layers away from the base substrate, and thicknesses of the refractive layers are nλ+λ/4, where λ is a wavelength of incident light, and n is a nonnegative integer, thereby reflective light rays are superposed on each other, generating a light counteraction effect and reducing reflectance, wherein the other of two adjacent refractive layers is directly located on the one of two adjacent refractive layers, and wherein refractive indexes of the at least two refractive layers gradually increase along a direction from the refractive layer close to the base substrate to the refractive layer away from the base substrate.

2. The display substrate according to claim 1, wherein the at least two refractive layers are a first refractive layer close to the base substrate and a second refractive layer away from the base substrate.

3. The display substrate according to claim 2, wherein the first refractive layer comprises silicon nitride material, and the second refractive layer comprises amorphous silicon material.

4. The display substrate according to claim 3, wherein the first refractive layer has a thickness in a range of 50 nm to 60 nm, and the second refractive layer has a thickness in a range of 25 nm to 35 nm, or 55 nm to 65 nm.

5. The display substrate according to claim 4, wherein the thickness of the first refractive layer is 55 nm, and the thickness of the second refractive layer is 30 nm or 60 nm.

6. A display panel, comprising the display substrate according to claim 5.

7. A display panel, comprising the display substrate according to claim 4.

8. The display substrate according to claim 3, wherein the first refractive layer has a refractive index in a range of 1.8 to 2.2, and the second refractive layer has a refractive index in a range of 4.0 to 4.8.

9. The display substrate according to claim 8, wherein the refractive index of the first refractive layer is 2.0, and the refractive index of the second refractive layer is 4.4.

10. A display panel, comprising the display substrate according to claim 9.

11. A display panel, comprising the display substrate according to claim 8.

12. A display panel, comprising the display substrate according to claim 3.

13. A display panel, comprising the display substrate according to claim 2.

14. A display panel, comprising the display substrate according to claim 1.

15. A display device, comprising the display panel according to claim 14.

16. A method for manufacturing a display substrate, comprising steps of:

forming at least two refractive layers on a base substrate, wherein a refractive index of one of two adjacent refractive layers close to the base substrate is less than a refractive index of the other of two adjacent refractive layers away from the base substrate, and thicknesses of the refractive layers are $n\lambda+\lambda/4$, where $\lambda$ is a wavelength of incident light, and n is a nonnegative integer, thereby reflective light rays are superposed on each other, generating a light counteraction effect and reducing reflectance; and forming a gate electrode on the refractive layers, wherein the other of two adjacent refractive layers is directly located on the one of two adjacent refractive layers, and wherein refractive indexes of the at least two refractive layers gradually increase along a direction from the refractive layer close to the base substrate to the refractive layer away from the base substrate.

17. The method according to claim 16, wherein the step of forming at least two refractive layers on the base substrate comprises steps of:

forming a first refractive layer on the base substrate; and forming a second refractive layer on the first refractive layer.

18. The method according to claim 17, wherein the first refractive layer comprises silicon nitride material, and the second refractive layer comprises amorphous silicon material.

19. The method according to claim 18, wherein the steps of forming the second refractive layer on the first refractive layer and forming the gate electrode on the refractive layers comprise steps of:

forming the second refractive film on the first refractive layer;

forming a gate metal film on the second refractive film; and etching the second refractive film and the gate metal film so as to form the second refractive layer and the gate electrode, wherein the second refractive layer is located right below the gate electrode.

* * * * *